United States Patent
Chivers

(10) Patent No.: US 9,884,972 B2
(45) Date of Patent: Feb. 6, 2018

(54) AQUEOUS COMPOSITION FOR CLEANING OR REMOVING COATINGS COMPRISING A PHOSPHATE COMPOUND AND AN ESTER COMPOUND

(71) Applicant: ECO-SOLUTIONS LIMITED, North Somerset (GB)

(72) Inventor: Ivor M. Chivers, North Somerset (GB)

(73) Assignee: ECO-SOLUTIONS LIMITED, North Somerset (GB)

( * ) Notice: Subject to any disclaimer, the term of this patent is extended or adjusted under 35 U.S.C. 154(b) by 0 days.

(21) Appl. No.: 15/319,952

(22) PCT Filed: Jun. 15, 2015

(86) PCT No.: PCT/GB2015/051754
§ 371 (c)(1),
(2) Date: Dec. 19, 2016

(87) PCT Pub. No.: WO2015/193649
PCT Pub. Date: Dec. 23, 2015

(65) Prior Publication Data
US 2017/0130078 A1  May 11, 2017

(30) Foreign Application Priority Data
Jun. 20, 2014 (GB) .................................. 1411065.4

(51) Int. Cl.
*C09D 9/04* (2006.01)
(52) U.S. Cl.
CPC ..................................... *C09D 9/04* (2013.01)
(58) Field of Classification Search
CPC . C11D 17/043; C11D 17/0095; C11D 3/0057; C11D 3/2093; C11D 3/362; C11D 3/393; C11D 7/261; C11D 7/262; C11D 7/266; C11D 7/5009; C11D 11/0023; C11D 11/0029; C11D 17/003
See application file for complete search history.

(56) References Cited

U.S. PATENT DOCUMENTS

| | | | | |
|---|---|---|---|---|
| 4,151,138 A | * | 4/1979 | Citrone | C09G 1/10 427/221 |
| 6,153,573 A | * | 11/2000 | Reynolds | C09D 9/04 134/38 |
| 6,339,053 B1 | * | 1/2002 | Chivers | C09D 9/04 134/38 |
| 6,468,952 B1 | * | 10/2002 | Reynolds | C09D 9/04 510/201 |

FOREIGN PATENT DOCUMENTS

EP  1064334  6/2006

OTHER PUBLICATIONS

International Preliminary Examination Report in related PCT Application PCT/GB2015/051754, dated Oct. 5, 2016, 18 pages.
International Search Report and Written Opinion in related PCT Application PCT/GB2015/051754, dated Sep. 24, 2015, 9 pages.

* cited by examiner

Primary Examiner — Charles Boyer
(74) Attorney, Agent, or Firm — Hovey Williams LLP

(57) ABSTRACT

An aqueous composition for cleaning surfaces, for removing coatings from surfaces, or for plasticizing or softening coatings or other surface-adhered materials prior to stripping or mechanical removal thereof from the surface, comprises a trialkyi or triaryl phosphate, a dibasic or tribasic carboxylic acid ester, and greater than 80% by weight of water. The composition is useful in removing grease, waxes, oil, resins, tar, ink, magic marker ink, paint (including spray-paint), varnish, lacquer, stains (including wood staining compositions applied to a wooden surface), dirt, mold or foodstuffs from surfaces.

16 Claims, 4 Drawing Sheets

AQUEOUS COMPOSITION FOR CLEANING OR REMOVING COATINGS COMPRISING A PHOSPHATE COMPOUND AND AN ESTER COMPOUND

RELATED APPLICATIONS

This application is the National Stage of International Patent Application No. PCT/GB2015/051754, filed Jun. 15, 2015, which is hereby incorporated by reference in its entirety, and which claims priority to United Kingdom Patent Application No. GB 1411065.4, filed Jun. 20, 2014.

TECHNICAL FIELD

The present invention relates generally to an aqueous composition for cleaning surfaces, for removing coatings from surfaces, or for plasticising or softening coatings or other surface-adhered materials prior to stripping or mechanical removal thereof from the surface. For example, the composition of the present invention is useful in removing grease, waxes, oil, resins, tar, ink, magic marker ink, paint (including spray-paint), varnish, lacquer, stains (including wood staining compositions applied to a wooden surface), dirt, mould or foodstuffs from surfaces.

BACKGROUND OF THE INVENTION

Solvent-based compositions, for example based on methylene chloride or other volatile organic compounds, are known for cleaning surfaces and/or removing organic coatings from surfaces. Such compositions, and the fumes they emit, are generally irritant, smelly and toxic. This necessitates special storage and handling procedures, particularly for commercial use, as well as protective clothing and equipment for users. It is thus desirable to provide aqueous compositions to replace these solvent-based compositions, which have the desired cleaning and coating-removal effects.

Aqueous cleaning compositions based on caustic acids or alkalis are also known. The chemical reactivity of such compositions poses substantial health and safety concerns, necessitating special storage and handling procedures, particularly for commercial use. It is thus desirable also to provide safe aqueous compositions which have the desired cleaning and coating-removal effects, to replace the known caustic compositions.

Non-toxic aqueous compositions for removing organic coatings, including for example for plasticising or softening coatings such as paint prior to stripping, are known. Such compositions are described in EP-B-0869997 and EP-B-1064334, both to the present applicant Eco Solutions Limited of Winscombe, GB. The disclosures of these prior art documents are incorporated herein by reference. However, there remains a need to provide improved aqueous compositions for cleaning surfaces and removing coatings from surfaces.

The present invention is based on our surprising finding that the compositions described in EP-B-0869997 and EP-B-1064334 retain a highly effective cleaning and coating-removal activity and can exist as a stable and optically clear emulsion, both in a thickened and unthickened form, at water contents in excess of those described in the prior art, for example in excess of 80% water by weight, for example in excess of 85% or 90% or 95% water by weight, up to about 99.0% water by weight.

Example 1 of U.S. Pat. No. 4,070,510, the disclosure of which is incorporated herein by reference, describes an aqueous floor polish composition including tributoxyethyl phosphate, dibutyl phthalate and a surfactant, and an aqueous dispersion containing these ingredients from which the polish composition can be manufactured by addition of other components.

SUMMARY OF THE INVENTION

In accordance with a first aspect of the present invention, there is provided an aqueous composition comprising:
(a) the following components (i) and (ii):
(i) at least one compound of formula (I)

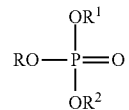

wherein R, $R^1$ and $R^2$, which may be the same or different, represent optionally substituted lower alkyl, optionally substituted phenyl or optionally substituted lower alkyl-phenyl groups; and
(ii) at least one ester selected from optionally substituted lower alkyl diesters of dibasic $C_{2-20}$ carboxylic acids and optionally substituted lower alkyl triesters of tribasic $C_{4-20}$ carboxylic acids;
(b) optionally, at least one surfactant;
(c) water;
(d) optionally, a rheology control agent to cause the composition to be in the form of a gel; and
(e) optionally, one or more anti-foaming agent cooperating with the surfactant(s) to reduce foaming;
characterised in that:
component (c) (water) is present in an amount of greater than 80% and less than about 99.0% by weight of the aqueous composition;
the composition is a stable emulsion; and
preferably, the composition formed by components (a), (c) and if present (b) is optically transparent;
with the proviso that, when component (a(i)) is or includes tributoxyethyl phosphate and component (a(ii)) is or includes simultaneously dibutyl phthalate, then component (c) (water) is present in an amount of greater than 85.0% by weight of the aqueous composition.

To the extent that the laws and practices of any country or Patent Office provide that the use of alternative compounds of formula (I) included in the list of compounds from column 6, line 62 to column 7, line 16 of U.S. Pat. No. 4,070,510, simultaneously with the use of at least one optionally substituted lower alkyl diester of a dibasic $C_{2-20}$ carboxylic acid included in the same list of compounds from U.S. Pat. No. 4,070,510, lacks novelty or is rendered obvious by the said US patent, then the proviso shall further provide that when components (a(i)) and (a(ii)) are or include simultaneously those compounds, then component (c) (water) is present in an amount of greater than 85.0%, for example greater than 90.0%, by weight of the aqueous composition.

For avoidance of doubt, the compounds of formula (I) included in the list of compounds from column 6, line 62 to column 7, line 16 of U.S. Pat. No. 4,070,510 are considered to be triphenyl phosphate, triethyl phosphate, tributyl phosphate, tricresyl phosphate, and tributoxyethyl phosphate, and the optionally substituted lower alkyl diesters of dibasic $C_{2-20}$ carboxylic acids included in the said list are considered to be benzyl butyl phthalate, dibutyl phthalate, dimethyl phthalate, 2-ethyl hexyl benzyl phthalate, butyl cyclohexyl phthalate, tetrabutylthiodisuccinate, butyl phthalyl butyl glycolate, dibenzyl sebacate, the di-2-ethylhexyl ester of hexamethylene glycol diphthalate, and di(methylcyclohexyl)phthalate.

The said composition exists as a stable, preferably optically transparent, emulsion which does not separate into oil and water phases. It can be thickened to increase its viscosity without impairing its optical or cleaning properties.

The composition according to the invention has been found to be effective for cleaning surfaces, for removing coatings from surfaces, or for plasticising or softening coatings or other surface-adhered materials prior to stripping or mechanical removal thereof from the surface. For example, the composition of the present invention is useful in removing grease, waxes, oil, resins, tar, ink, magic marker ink, paint (including spray-paint), varnish, lacquer, stains (including wood staining compositions applied to a wooden surface), dirt, mould or foodstuffs from surfaces.

In accordance with a second aspect of the present invention, there is provided the use, as a cleaning composition, as a composition for removing coatings from surfaces, or as a composition for plasticising or softening coatings or other surface-adhered materials prior to stripping or mechanical removal thereof from the surface, of an aqueous composition comprising:
(a) the following components (i) and (ii):
  (i) at least one compound of formula (I)

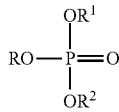

wherein R, $R^1$ and $R^2$, which may be the same or different, represent optionally substituted lower alkyl, optionally substituted phenyl or optionally substituted lower alkyl-phenyl groups; and
  (ii) at least one ester selected from optionally substituted lower alkyl diesters of dibasic $C_{2-20}$ carboxylic acids and optionally substituted lower alkyl triesters of tribasic $C_{4-20}$ carboxylic acids;
(b) optionally, at least one surfactant;
(c) water;
(d) optionally, a rheology control agent to cause the composition to be in the form of a gel; and
(e) optionally, one or more anti-foaming agent cooperating with the surfactant(s) to reduce foaming;
characterised in that:
component (c) (water) is present in an amount of greater than 80% and less than about 99.0% by weight of the aqueous composition;
the composition is a stable emulsion; and
preferably, the composition formed by components (a), (c) and if present (b) is optically transparent.

The said use may, for example, include removing grease, waxes, oil, resins, tar, ink, magic marker ink, paint (including spray-paint), varnish, lacquer, stains (including wood staining compositions applied to a wooden surface), dirt, mould or foodstuffs from surfaces.

The said composition is typically optically transparent and exists as a stable emulsion which does not have a cloudy appearance. The use of a rheology control agent to thicken the composition to the form of a gel can increase its viscosity without impairing its cleaning properties. Preferably, the thickened gel form will be optically transparent, like the unthickened form.

In accordance with a third aspect of the present invention, there is provided a method for cleaning a surface, or a method for removing a coating from a surface, or a method for plasticising or softening a coating or other surface-adhered material prior to stripping or mechanical removal thereof from a surface, comprising applying to the surface or coating an aqueous composition comprising:
(a) the following components (i) and (ii):
  (i) at least one compound of formula (I)

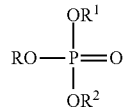

wherein R, $R^1$ and $R^2$, which may be the same or different, represent optionally substituted lower alkyl, optionally substituted phenyl or optionally substituted lower alkyl-phenyl groups; and
  (ii) at least one ester selected from optionally substituted lower alkyl diesters of dibasic $C_{2-20}$ carboxylic acids and optionally substituted lower alkyl triesters of tribasic $C_{4-20}$ carboxylic acids;
(b) optionally, at least one surfactant;
(c) water;
(d) optionally, a rheology control agent to cause the composition to be in the form of a gel; and
(e) optionally, one or more anti-foaming agent cooperating with the surfactant(s) to reduce foaming;
characterised in that:
component (c) (water) is present in an amount of greater than 80% and less than about 99.0% by weight of the aqueous composition;
the composition is a stable emulsion; and
preferably, the composition formed by components (a), (c) and if present (b) is optically transparent.

The said method may, for example, include removing grease, waxes, oil, resins, tar, ink, magic marker ink, paint (including spray-paint), varnish, lacquer, stains (including wood staining compositions applied to a wooden surface), dirt, mould or foodstuffs from surfaces.

The said composition is typically optically transparent and exists as a stable emulsion which does not have a cloudy appearance. The use of a rheology control agent to thicken the composition to the form of a gel can increase its viscosity without impairing its cleaning properties. Preferably, the thickened gel form will be optically transparent, like the unthickened form.

In accordance with a fourth aspect of the present invention, there is provided a process for making an aqueous composition according to the first aspect of the present invention and embodiments thereof, or an aqueous composition used in the second or third aspects of the present invention and embodiments thereof, comprising mixing components (a), (c) and optionally (b) and optionally (d) and optionally (e) to form a stable emulsion.

The composition according to the first aspect of the present invention and embodiments thereof, and the aqueous composition used in the second or third aspects of the present invention and embodiments thereof, preferably consists essentially of the components (a), (c) and optionally (b) and optionally (d) and optionally (e) as described herein, with any additional components present being subject to the condition that they do not materially affect the cleaning or coating-removal properties of the composition and/or they are present in no more than an amount of about 8% by weight of the composition.

The composition according to the first aspect of the present invention and embodiments thereof, and the aqueous composition used in the second or third aspects of the present invention and embodiments thereof, may, for example, consist only of the components (a), (c) and optionally (b) and optionally (d) and optionally (e) as described herein.

Compositions which consist essentially or only of the of the components (a), (c) and optionally (b) and optionally (d) and optionally (e) as described herein are novel and inventive, and they constitute further aspects of the present invention.

In accordance with a fifth aspect of the present invention, therefore, there is provided an aqueous composition consisting essentially of:
(a) the following components (i) and (ii):
    (i) at least one compound of formula (I)

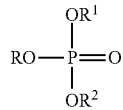

wherein R, R¹ and R², which may be the same or different, represent optionally substituted lower alkyl, optionally substituted phenyl or optionally substituted lower alkyl-phenyl groups; and
    (ii) at least one ester selected from optionally substituted lower alkyl diesters of dibasic $C_{2-20}$ carboxylic acids and optionally substituted lower alkyl triesters of tribasic $C_{4-20}$ carboxylic acids;
(b) optionally, at least one surfactant;
(c) water;
(d) optionally, one or more rheology control agent to cause the composition to be in the form of a gel; and
(e) optionally, one or more anti-foaming agent cooperating with the surfactant(s) to reduce foaming;
characterised in that:
component (c) (water) is present in an amount of greater than 80% and less than about 99.0% by weight of the aqueous composition;
the composition is a stable emulsion; and
preferably, the composition formed by components (a), (c) and if present (b) is optically transparent.

The phrase "consisting essentially of" in the definition of the fifth aspect of the present invention and embodiments of that aspect typically means that additional components may be present, subject to the condition that they do not materially affect the cleaning or coating-removal properties of the composition and/or they are present in no more than an amount of about 8% by weight of the composition.

In accordance with a sixth aspect of the present invention, therefore, there is provided an aqueous composition consisting only of:

(a) the following components (i) and (ii):
    (i) at least one compound of formula (I)

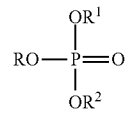

wherein R, R¹ and R², which may be the same or different, represent optionally substituted lower alkyl, optionally substituted phenyl or optionally substituted lower alkyl-phenyl groups; and
    (ii) at least one ester selected from optionally substituted lower alkyl diesters of dibasic $C_{2-20}$ carboxylic acids and optionally substituted lower alkyl triesters of tribasic $C_{4-20}$ carboxylic acids;
(b) optionally, at least one surfactant;
(c) water;
(d) optionally, a rheology control agent to cause the composition to be in the form of a gel; and
(e) optionally, one or more anti-foaming agent cooperating with the surfactant(s) to reduce foaming;
characterised in that:
component (c) (water) is present in an amount of greater than 80% and less than about 99.0% by weight of the aqueous composition;
the composition is a stable emulsion; and
preferably, the composition formed by components (a), (c) and if present (b) is optically transparent.

The preferences and embodiments of the compositions described herein apply to the compositions in any one or more of any of the aspects of the invention.

The compositions according to, and used in, the present invention may, for example, contain water in an amount of about 81%, about 82%, about 83%, about 84%, about 85%, about 86%, about 87%, about 88%, about 89%, about 90%, about 91%, about 92%, about 93%, about 94%, about 95%, about 96%, about 97% or about 98%, in each case by weight. The water should not be present in an amount of greater than about 99.0% by weight.

The compositions according to, and used in, the present invention are preferably free from any caustic acid or alkali components such as sodium or potassium hydroxide or other caustic cleaning products. The pH of the compositions according to, and used in, the present invention is preferably in the range of about 5 to 9, namely around neutral.

The compositions according to, and used in, the present invention are preferably non-toxic and not damaging to skin, eyes or internal organs.

The compositions according to, and used in, the present invention have been found to display a remarkable cleaning and coating-removal activity, coupled with a surprising optical clarity and transparency without colour or cloudiness. The stability of the emulsion is high and the compositions do not separate into phases on standing or storage.

To assist the cleaning, softening or removing action of the compositions of the present invention, heat and/or mechanical abrasion (rubbing) may be applied with the compositions on the surface to be treated.

The aqueous compositions according to, and used in, the present invention provide one or more of the following advantages:
Low toxicity and low irritancy;
High volume of water resulting in an economically and environmentally favourable composition;
Stable emulsion resulting in a long shelf-life;
Stable microemulsion resulting in a clear/transparent composition;

Does not require further treatment (e.g. wash down with water) after use;
No requirement for neutralisation;
Improved or at least comparative cleaning properties compared to other products for the same use;
Is able to clean a surface without significantly damaging the paint on the surface;
Is able to clean a surface without significantly damaging the finish of the surface (e.g. texture of wood);
Improved or at least comparative coating-removal properties compared to other products for the same use;
Easily applicable;
Quick-acting.

The details, examples and preferences provided in relation to any particular one or more of the stated aspects of the present invention apply equally to all aspects of the present invention. Any combination of the embodiments, examples and preferences described herein in all possible variations thereof is encompassed by the present invention unless otherwise indicated herein, or otherwise clearly contradicted by context.

DETAILED DESCRIPTION OF THE INVENTION

Aqueous Composition

The aqueous composition is in the form of a stable emulsion, which includes suspensions and dispersions. Preferably, the aqueous composition exists as a stable microemulsion, which may, for example be an "oil-in-water" emulsion. It should be noted that the phrase "stable emulsion" or "stable microemulsion" used herein refers particularly to an emulsion or microemulsion which is stable with respect to separation into unemulsified phases over a period of time normally required for such a composition, typically a few weeks or months. The word "microemulsion", which includes suspensions and dispersions, refers to emulsions in which the emulsified droplets are of a size less than about 0.1 μm, so that the composition is clear/transparent and no milkiness results.

It is most preferred, for safety reasons, that the organic components of the composition have a relatively high flash point (i.e. well above normal operating temperatures). It is also preferred, for convenience, that the organic components of the composition are liquid over the full range of normal operating temperatures.

Component (a)

The phrase "lower alkyl" herein refers to alkyl groups containing up to 8 carbon atoms, for example methyl, ethyl, n-propyl, s-propyl, n-butyl, s-butyl, t-butyl, pentyl and hexyl groups. Such alkyl groups may optionally be mono- or poly-substituted, for example by one or more substituents selected from halo, nitro, amino, $C_{1-4}$ alkylamino, di-$C_{1-4}$alkylamino, hydroxy, $C_{1-4}$ alkoxy, carboxy, ($C_{1-4}$ alkyl)carbonyl, ($C_{1-4}$ alkoxy)cabonyl, $C_{2-4}$ alkanoyloxy, ($C_{1-4}$ alkyl)carbamoyl, aryl and cycloalkyl groups or salt derivatives thereof. Phenyl portions of compounds of formula (I) may optionally be similarly mono- or poly-substituted.

The at least one compound of formula (I) forming component (a(i)) of the aqueous composition is preferably water-soluble or water-miscible, if necessary with the assistance of solubilising agents. However, insoluble or non-miscible compounds may be used provided that they are emulsifiable or suspendible, if necessary with the assistance of emulsifying and/or suspending agents.

The compound of formula (I) may, for example, be a trialkylphosphate. The alkyl groups of the trialkylphosphate may, for example, all be the same (i.e. $R=R^1=R^2$). For example, the compound of formula (I) may be triethylphosphate ($R=R^1=R^2$=ethyl) or tributylphosphate ($R=R^1=R^2$=butyl). Triethylphosphate has been found to exhibit high activity, non-toxicity and water-miscibility.

The at least one ester selected from dibasic and tribasic carboxylic acid esters forming component (a(ii)) of the aqueous composition may be or include a lower alkyl diester of a straight-chain fully or partially saturated $C_{2-20}$ alkyl dicarboxylic acid. The ester groups may be the same or different. For example, suitable carboxylic acid diesters include alkyl esters of fully or partially saturated straight-chain dibasic carboxylic acids such as, for example, $C_{2-10}$ alkanedioic acids, more particularly $C_{4-8}$ alkanedioic acids such as succinic acid (butanedioic acid) or adipic acid (hexanedioic acid) or $C_{8-16}$ aromatic dicarboxylic acids such as phthalic acid. Mixtures of dibasic esters may also be used. The alkyl groups forming the esters may suitably be selected from lower alkyl groups (alkyl groups containing up to 8 carbon atoms), more particularly methyl, ethyl, propyl, n-butyl and octyl. Alkyl portions of the ester of component (a(ii)) may optionally be mono- or poly-substituted, in one or more of the acid and ester moieties, for example by one or more substituents selected from halo, nitro, amino, $C_{1-4}$ alkylamino, di-$C_{1-4}$ alkylamino, hydroxy, $C_{1-4}$ alkoxy and $C_{2-4}$ alkanoyloxy groups or salt derivatives thereof.

For example, the carboxylic acid ester forming component (a(ii)) of the aqueous composition may be or include a lower alkyl ester of a straight-chain fully or partially saturated $C_{2-20}$ alkyl di-carboxylic acid (a dibasic ester). For example, the at least one carboxylic acid ester forming component (a(ii)) of the aqueous composition may be one or more of: a dialkyl adipate such as dimethyl adipate or diethyl adipate, or a dialkyl succinate such as dimethyl succinate or diethyl succinate, or a dialkyl glutamate such as dimethyl glutamate or diethyl glutamate, or a dialkyl glutarate such as dimethyl glutarate or diethyl glutarate, or a dialkyl phthalate such as dimethyl phthalate or diethyl phthalate, or a dialkyl azelate such as dimethyl azelate or diethyl azelate. Preferably, the carboxylic acid ester is or includes dimethyl adipate. An example of a suitable mixture of esters is dialkyl (e.g. dimethyl) adipate, dialkyl (e.g. dimethyl) succinate and dialkyl (e.g. dimethyl) glutarate. For example, a mixture consisting of about 10 to about 25% by weight dimethyl adipate, about 15 to about 25% by weight dimethyl succinate and about 55 to about 65% dimethyl glutarate may be used.

The at least one ester selected from dibasic and tribasic carboxylic acid esters forming component (a(ii)) of the aqueous composition may be or include a lower alkyl triester of a straight-chain fully or partially saturated $C_{4-20}$ alkyl tricarboxylic acid. Mixtures of tribasic esters may be used. The ester groups may be the same or different. For example, suitable carboxylic acid triesters include alkyl esters of fully or partially saturated straight-chain tribasic carboxylic acids such as, for example, citric acid. The alkyl groups forming the esters may suitably be selected from lower alkyl groups (alkyl groups containing up to 8 carbon atoms), more particularly methyl, ethyl, propyl, n-butyl and octyl. Alkyl portions of the ester of component (a(ii)) may optionally be mono- or poly-substituted, in one or more of the acid and ester moieties, for example by one or more substituents selected from halo, nitro, amino, $C_{1-4}$ alkylamino, alkylamino, hydroxy, $C_{1-4}$ alkoxy and $C_{2-4}$ alkanoyloxy groups or salt derivatives thereof.

The ester component (a(ii)) is typically poorly soluble or non-soluble in the aqueous composition. Therefore, this component is typically present in the hydrophobic/oil phase of the microemulsion.

Both components (a(i)) and (a(ii)) of the aqueous composition are preferably non-toxic. The expression "non-toxic" used herein refers to an acceptably low level of toxicity when the compound is present at an effective amount, and not necessarily to a complete absence of toxic effects. In particular, compounds which have only a temporary toxic effect and do no significant permanent harm, will be referred to and understood as "non-toxic" herein. Particular toxic effects which are to be avoided in the compositions of the present invention are carcinogenicity, teratogenicity and mutagenicity.

The hydrophobic/oil phase of the aqueous composition may consist essentially of components (a(i)) and (a(ii)). Components (a(i)) and (a(ii)) may, for example, be present in a partitioned state between the hydrophobic and aqueous phases.

Components (a(i)) and (a(ii)) may, for example, each be present in the aqueous composition in an amount equal to or less than about 9%, for example equal to or less than about 8%, for example equal to or less than about 7%, for example equal to or less than about 6%, for example equal to or less than about 5%, for example equal to or less than about 4%, for example equal to or less than about 3%, for example equal to or less than about 2%, by weight of the composition.

Components (a(i)) and (a(ii)) may, for example, each be present in the aqueous composition in an amount of at least about 1%, for example at least about 1.25%, for example at least about 1.5%, for example at least about 1.75%, by weight of the aqueous composition.

The composition preferably contains substantially equal volumes of components (a(i)) and (a(ii)). Surprisingly, this has been found to enhance the formation of a clear stable microemulsion, even at very low water levels where the formation of emulsions of any description becomes difficult.

Component (b) (Optional)

The at least one surfactant, when present, may, for example, be selected from non-ionic water-soluble block copolymers of more than one alkylene oxide. For example, the at least one surfactant may be a block copolymer comprising ethylene oxide and propylene oxide. These surfactants can provide a wide range of emulsification and dispersant effects, optionally functioning also as gelling agents. Such copolymer surfactants typically have an approximate molecular weight in the range of about 8000 to about 16,000 (e.g. about 12,000). Such copolymer surfactants may have an approximate hydroxyl value in the range of about 5 to about 15 mg KOH/g (e.g. about 8.5 to about 11.5 mg KOH/g).

For example, the at least one surfactant may be a block copolymer of ethylene oxide and propylene oxide in which the proportion (x) of the polyoxyethylene hydrophile in the copolymer (expressed as a percentage by weight) is approximately related to the molecular weight (y) of the polyoxypropylene hydrophobe by the formula $$y \geq 5000 - 40x$$

Such copolymers generally have a HLB value in the range of about 20 to 28, as determined chromatographically. Water-soluble Synperonic PE™ surfactants (ICI, England), e.g. of the F-series (referring to their flake appearance), may be used.

The at least one surfactant may, for example, be present in the aqueous composition in an amount equal to or less than about 5%, for example equal to or less than about 3%, for example equal to or less than about 2%, by weight of the aqueous composition.

The at least one surfactant may, for example, be present in the aqueous composition in an amount of at least about 0.1%, for example least about 0.2%, for example at least about 0.3%, by weight of the aqueous composition.

Component (c)

The aqueous composition comprises greater than 80% water by weight of the total composition. For example, water may be present in the aqueous composition in an amount equal to or greater than about 85%, for example equal to or greater than about 86%, for example equal to or greater than about 87%, for example equal to or greater than about 88%, for example equal to or greater than about 89% by weight of the aqueous composition.

According to the invention, the water is present in the aqueous composition in an amount equal to or less than about 99.0% by weight of the aqueous composition. For example, water may be present in the aqueous composition in an amount equal to or less than about 98%, for example equal to or less than about 97%, for example equal to or less than about 96%, for example equal to or less than about 95% by weight of the aqueous composition.

In the case of compositions containing relatively high proportions of water, for example greater than about 95% by weight, it may be preferred to use more physical power (e.g. rubbing) to clean the surface or to remove a coating from a surface using the composition of the present invention.

Generally speaking, using the compositions of the present invention at an elevated temperature above normal room or ambient temperature (e.g. about 20° C.) will be expected to enhance the action of the compositions in cleaning surfaces, removing coatings from surfaces, or plasticising or softening coatings or other surface-adhered materials prior to stripping or mechanical removal thereof from the surface. A suitable elevated temperature may, for example, be in the range of about 30 to 50° C., for example about 45° C. Especially in an industrial context, where heating devices will be more readily available, the use of an elevated temperature may enable compositions having a relatively high water content, for example above about 90% by weight, to be used economically without loss of effective activity.

Component (d) (Optional)

The aqueous composition may optionally include a rheology control agent ("thickener") to cause the composition to be in the form of a gel.

The one or more rheology control agent, when present, may be selected from:

synthetic smectic clays composed of layered hydrous magnesium silicate free from crystalline silica. For example a synthetic hectorite clay such as Laponite (trade mark) (Laporte), which is a rapid dispersing clear and highly effective gelling agent. Preferably, fluorine-free grades of Laponite are preferred. It has been found that the combination of Laponite and the emulsion/suspension confers rheological properties on the composition which produce particularly good brush pickup, brush application and hold-up without sagging or slumping, even at high film builds.

Amide-modified hydrogenated castor oil based thixotropes.

Polyamide organic rheological additives.

Combinations of fumed (pyrogenic) silicas and polymer wax anti-settling agents.

Cross-linked non-acrylic hydrolysable vinyl ether/maleic anhydride copolymers. Such copolymers include alkyl (e.g. C1-4 alkyl such as methyl) vinyl ether/maleic anhydride copolymers cross-linked with an alkadiene such as 1,9-decadiene (see EP-B-1064334, paragraphs [0052] to [0055]). Upon hydrolysis with water, the maleic anhydride rings may be hydrolysed to give free diacid groups. Preferably, the polymers are available as white or off-white powders, having a moisture content of less than about 10% and a particle size less than about 1000 µm. Vinyl ether/maleic anhydride copolymers are acidic on contact with water and are suitably adjusted to maximum viscosity between pH 3.0 and pH 8.0 (e.g. about pH 7.0) by addition of base. The copolymer may, for example be STABILEZE® 06, available from International Speciality Products, UK (tel: +44 161 998 1122). An alternative copolymer is STABILEZE® QM, available from the same source.

As examples of suitable amide-modified hydrogenated castor oil based thixotropes, there are particularly mentioned white or off-white micronised powder thixotropes appropriate to solvent-based systems, which have limited solubility in the solvent and a tendency to swell in the solvent to some extent. The resultant suspension of finely divided, uniformly swollen thixotrope particles forms a supporting network for the thickened composition. One such rheology control agent that has been found to be particularly suitable is CRAYVALLAC MT (trade mark), available from Cray Valley Limited, Newport, UK (tel: +44 1633 440356).

As examples of suitable polyamide organic rheological additives, there are particularly mentioned white or off-white micronised non-organoclay non-hydrogenated-castor-oil based additives (e. g. polyamide waxes) appropriate to solvent-based systems, which have controlled thixotropic characteristics and good sag resistance whilst maintaining good flow and levelling and application properties such as build in the thickened composition. One such additive that has been found to be particularly suitable is CRAYVALLAC SUPER (trade mark), available from Cray Valley Limited, Newport, UK (tel: +44 1633 440356).

As examples of suitable combinations of fumed silicas and polymer wax anti-settling agents there are particularly mentioned white or off-white liquid polymer wax anti-settling additives used in association with sufficient fumed (pyrogenic) silica powder to adjust the rheology to the desired characteristics. The precise ratios of the components are readily determined by one of ordinary skill in this art. As fumed silicas, the hydrophobic grades are generally preferred. Such silicas are not substantially wetted by water and in powder form they tend to float on water. They are characterised by a reduced number of surface silanol (Si—OH) groups (typically less than about 40% of the number present at the surface of hydrophilic fumed silicas), the remainder converted to hydrophobic modified forms such as dialkylsilylated forms (e.g. $Si—O—Si(CH_3)_2$). The fumed silicas are available as fine white powders, dry or in a carrier liquid, having an average primary particle size typically in the range of about 5 to about 20 nm. One such combination of wax and silica that has been found to be particularly suitable is M-P-A-2000X (registered trade mark), available from NL chemicals, Hightstown, N.J., USA (tel: +1 609 443 2500) (when used either as a white solid wax after evaporating off the carrier solvent in which it is supplied, or alternatively in solvent) in association with a sufficient amount of a fumed silica such as HDK-NZO (trade mark), available from Wacker, or AEROSIL (hydrophobic grade), available from Degussa AG (tel: +49 6181 59 32 49).

The rheology control agent, when present, is suitably used in an amount equal to or less than about 8%, for example equal to or less than about 5%, for example equal to or less than about 4%, for example equal to or less than about 2% by weight of the aqueous composition. The ability of the aqueous composition to attach to non-horizontal surfaces, for example vertical surfaces or the underside of horizontal surfaces may be related to the amount of rheology control agent present in the aqueous composition. For example, aqueous compositions may be able to attach to vertical surfaces when the rheology control agent is present in the aqueous composition in an amount equal to or greater than about 2%, for example equal to or greater than about 2.5% by weight of the aqueous composition. For example, the aqueous compositions may be able to attach to the underside of horizontal surfaces when the rheology control agent is present in the aqueous composition in an amount equal to or greater than about 3%, for example equal to or greater than about 3.5% by weight of the aqueous composition.

The thickened composition, for example, be in the form of a thixotropic gel or gel-like paste. The thixotropic gel or gel-like paste may be easily taken up on a brush and applied to the surface to be treated. When the brush is removed, the composition may re-thicken on the surface, sufficiently to adhere to the surface even against the effect of gravity on a vertical surface. The composition may, for example, readily stay in contact with the surface for a sufficient length of time to allow the cleaning or coating-removal action to proceed to the desired extent. For example, the composition may readily stay in contact with the surface for a sufficient length of time to allow the plasticising or softening action to proceed to the desired extent.

The thickened aqueous composition may exist as a thick white or off-white gel-like material. Alternatively, the thickened composition may be a substantially transparent or translucent gel.

The thickened aqueous composition may be capable of supporting its own weight and giving thick coats onto a vertical surface and/or the underside of a horizontal surface (e.g. ceiling). After application to the surface, the composition may not dry quickly and may easily be washed or wiped off, for example together with the degraded coating material, or can be removed by relatively mild mechanical scraping or stiff brushing.

The thickened aqueous composition may exhibit shear thinning behaviour, typically showing a high yield value or initial resistance to flow.

The thickness of the gel is preferably such that the yield values (Brookfield) in a laboratory model gel system using these thickening agents and containing 0.25% suspended sand solids (gel neutralised to pH 7 with sodium hydroxide) are in the range of approximately 2,100 to 2,600 (temperature range 55° C. to 28° C. respectively), more particularly 5,900 to 6,500, dynes $cm^{-2}$. In all cases the sand is suspended indefinitely, without loss of the suspension over time.

Component (e) (Optional)

The aqueous composition may optionally include one or more anti-foaming agent cooperating with the surfactant(s) to reduce foaming.

The anti-foaming agent may, for example, be an organic alcohol, suitably a $C_{1-10}$ alkyl alcohol, for example a $C_{4-8}$ alkanol. For example, the anti-foaming agent may be or comprise hexan-1-ol. The anti-foaming agent can improve the strength and stability of the (micro)emulsion, and assist in reducing foaming of the composition.

The one or more anti-foaming agents may, for example, also be selected from one or more polydimethylsiloxanes and other silicones, stearates and glycols.

The one or more anti-foaming agents may, for example, be present in the aqueous composition in an amount equal to or less than about 5%, for example equal to or less than about 2%, for example equal to or less than about 1% by weight of the aqueous composition. For example, the one or more anti-foaming agents may be present in an amount equal to or less than about 0.5%, for example equal to or less than about 0.3%, for example equal to or less than about 0.2%, for example equal to or less than about 0.1% by weight of the aqueous composition.

Other Additives

The aqueous composition may suitably comprise one or more additional components. For example, the composition may include conventional fillers, binders, stabilising agents, colorants and biocides.

The additional components may suitably comprise equal to or less than about 10% by weight and/or volume of the aqueous composition. For example, the additional components may comprise equal to or less than about 8%, for example equal to or less than about 7%, for example equal to or less than about 6%, for example equal to or less than about 5%, for example equal to or less than about 4%, for example equal to or less than about 5% by weight of the aqueous composition.

Exemplary Compositions

The aqueous composition may, for example, comprise (all % are by weight of the total aqueous composition):
- from about 1% to about 10% component (a(i)) (e.g. polyalkylphosphate such as triethylphosphate);
- from about 1% to about 10% component (a(ii)) (e.g. an alkyl diester of a di-carboxylic acid such as dimethyl adipate);
- from about 0% to about 5%, for example from about 0.1% to about 5%, component (b) (e.g. a non-ionic block copolymer of more than one alkylene oxide such as ethylene oxide and propylene oxide);
- greater than about 80% to about 98% water; and
- from about 0% to 5% additional additives (e.g. from about 0% to about 2% of one or more anti-foaming agent and/or from about 0% to about 5% of one or more rheology control agents).

Preferably, in the above example the proportion of component (a(i)) is substantially equivalent to the proportion of component (a(ii)).

For example, the aqueous composition may comprise (all % are by weight of the total aqueous composition):
- from about 1% to about 8% component (a(i)) (e.g. polyalkylphosphate such as triethylphosphate);
- from about 1% to about 8% component (a(ii)) (e.g. an alkyl diester of a di-carboxylic acid such as dimethyl adipate);
- from about 0% to about 5%, for example from about 0.1% to about 2%, component (b) (e.g. a non-ionic block copolymer of more than one alkylene oxide such as ethylene oxide and propylene oxide);
- from about 85% to about 98% water; and
- from about 0% to 3% additional additives (e.g. from about 0% to about 1% of one or more anti-foaming agent and/or from about 0% to about 3% of one or more rheology control agents).

Preferably, in the above example the proportion of component (a(i)) is substantially equivalent to the proportion of component (a(ii)).

For example, the aqueous composition may comprise (all % are by weight of the total aqueous composition):
- from about 2% to about 5% component (a(i)) (e.g. polyalkylphosphate such as triethylphosphate);
- from about 2% to about 5% component (a(ii)) (e.g. an alkyl diester of a di-carboxylic acid such as dimethyl adipate);
- from about 0% to about 5%, for example from about 0.1% to about 2%, component (b) (e.g. a non-ionic block copolymer of more than one alkylene oxide such as ethylene oxide and propylene oxide);
- from about 88% to about 95% water; and
- from about 0% to 3% additional additives (e.g. from about 0% to about 1% of one or more co-surfactant and/or from about 0% to about 3% of one or more rheology control agents).

Preferably, in the above example the proportion of component (a(i)) is substantially equivalent to the proportion of component (ii).

Uses of the Aqueous Compositions

The aqueous compositions of the present invention may be used for cleaning surfaces, for removing coatings from surfaces, or for plasticising or softening coatings or other surface-adhered materials prior to stripping or mechanical removal thereof from the surface.

For example, the composition of the present invention is useful in removing grease, waxes, oil, resins, tar, ink, magic marker ink, paint (including spray-paint), varnish, lacquer, stains (including wood staining compositions applied to a wooden surface), dirt, mould or foodstuffs from surfaces.

The aqueous compositions, for example the un-thickened aqueous compositions, may be able to clean a surface without significantly damaging the paint on said surface. For example, the aqueous compositions may be able to clean a surface without removing paint from a surface such that the colour and/or finish of the paint is noticeable to the naked eye.

The aqueous compositions of the present invention, including all embodiments and combinations thereof, may be used for removing organic coatings such as paint, varnish and lacquer from a surface. For example, the organic coatings may be removed by plasticising or softening the organic coating prior to stripping the organic coating from the surface.

Aqueous compositions further comprising a rheology control agent or aqueous compositions in the form of a thixotropic gel or gel-like paste may be particularly suitable for use in removing organic coatings from a vertical surface.

The aqueous compositions may, for example, be applied to the surface by gentle wiping or from a pressurised or pressurisable containers (e.g. sprayed). The pressurisable container may, for example, be a simple hand-held home spray container in which a low pressure spray is generated by a squeezing action of the hand. Typically, the composition is then left for a few minutes to act on the surface or coating, and is then mechanically removed by wiping off, scraping or the like. Alternatively, in some cases the composition may be washed off the surface with clean water.

Process for Making the Aqueous Composition

The compositions of the present invention may be prepared by simple admixture. It is preferred that the water and surfactant components are mixed first, before components (a(i)) and (a(ii)) are added. It is preferred that the less soluble compound(s) of components (a(i)) and (a(ii)) is/are added first to the water and any surfactant components, until an emulsion is formed. Then any more soluble compound(s) of components (a(i)) and (a(ii)) are added, followed by the remainder (if any) of water and any rheology control agent and/or minor additional ingredients. Any anti-foaming agent may be added before or after components (a(i)) and (a(ii)), or between different components (a(i)) and (a(ii)). It is preferable to add any anti-foaming agent before components (a(i)) and (a(ii)), as this is found to produce a more stable emulsion. The composition may suitably be stirred during and/or after the mixing to ensure complete mixing and emulsification. When the rheology control agent is added to the aqueous composition, high shear mixing may be used, and the resultant temperature rise may be controlled to no more than about 60° C., preferably 50 to 55° C.

The water component comprises greater than about 80% by weight of the aqueous composition. For both environmental and commercial reasons, it is desirable to use as small an amount as possible of components (a(i)) and (a(ii)), the surfactant and any rheology control agent and/or anti-foaming agent, and any optional minor additional ingredients mentioned above, and as large an amount as possible of water, while still preserving the desired characteristics and properties of the composition.

BRIEF DESCRIPTION OF THE DRAWINGS

The accompanying drawings show the following results.

EXAMPLES

Figure 1:
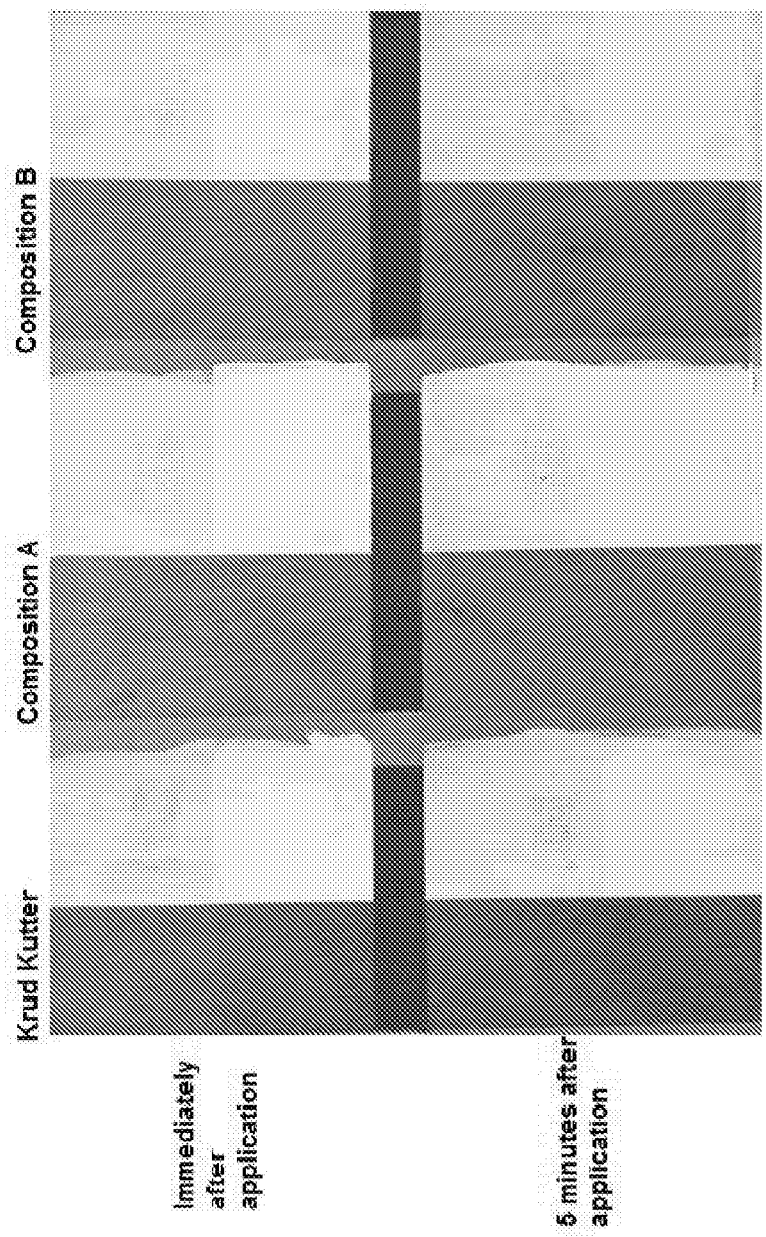
FIG. 1 shows the results of the experiment described in Example 1.

Formulations
The following aqueous compositions were prepared (proportions are % by weight).

|  | A (comparison) | B | C | D | E | F |
|---|---|---|---|---|---|---|
| Triethyl-phosphate (a(i)) | 10 | 5 | 2.5 | 1.25 | 4.86 | 7.50 |
| Dibasic Ester* (a(ii)) | 10 | 5 | 2.5 | 1.25 | 4.86 | 7.50 |
| Synperonic ™ F127 (b) | 1.46 | 0.73 | 0.36 | 0.18 | 0.71 | 1.09 |
| Water (c) | 78.43 | 89.21 | 94.61 | 97.31 | 86.79 | 80.83 |
| Laponite ® RD (d) | — | — | — | — | 2.72 | 3.00 |
| Hexan-1-ol (e) | 0.11 | 0.06 | 0.03 | 0.01 | 0.06 | 0.08 |
| Total | 100.00 | 100.00 | 100.00 | 100.00 | 100.00 | 100.00 |

*A mixture consisting of 10-25% by weight dimethyl adipate, 15-25% by weight dimethyl succinate and 55-65% dimethyl glutarate.

Composition A, a comparison composition similar to Example 1 of EP-B-0869997 but omitting the Germaben™ biocide, was prepared by mixing the components until a stable microemulsion was formed. Composition B was prepared by adding an equal weight of water to the weight of composition A. Composition C was prepared by adding an equal weight of water to the weight of composition B. Composition D was prepared by adding an equal weight of water to the weight of composition C. Composition E was prepared by adding 2.8% by weight of Laponite® to the composition B.

Composition A was found to be slightly biphasic (the emulsion was inclined to separate into oil and water phases and the Synperonic™ F127 surfactant had a tendency to settle out of the mixture). Unexpectedly, when composition B was prepared by 1:1 (w/w) dilution of composition A with water, the composition became clear and transparent and would not separate on standing into component parts. From this it is apparent that at above 80% by weight of water the composition takes on a substantially enhanced stability and a clear transparent product is produced.

Compositions A to E were compared to a marketed aqueous alkali cleaning product, Krud Kutter®, available from Krud Kutter UK, Histon, Cambridge CB24 9NU, United Kingdom (www.krudkutter.co.uk), which has the following formulation (available from http://krudkutter.com/imaqes/msds/kk-oriqinal%20krud%20kutter.pdf retrieved on 19 Jun. 2014; or from http://www.homedepot.com/catalog/pdfImaqes/aa/aae0fe79-7b1e-4cdf-90b5-60d9ffbd3594.pdf retrieved on 5 Jun. 2015):

90 to 97% water;
1 to 3% trisodium salt;
1 to 3% ethoxylated alcohol; and
1 to 3% sodium metasilicate.

The compositions B, C, D, E and F were stable monophasic, clear, transparent, compositions with very good action to clean surfaces, or to remove a coating from a surface, or to plasticise or soften a coating or other surface-adhered material prior to stripping or mechanically removing it from the surface, as shown by the following test examples.

Example 1—Cleaning/Stripping a Wax Coating and Remove the Stain from a Stained Wood Panel Compositions A and B, and the comparative product Krud Kutter® were used to clean a wax coating and remove the stain from a stained wood panel. The results immediately after application and 5 minutes after application were observed and are shown in FIG. 1.

The dark brown horizontal band across the middle of FIG. 1 shows the colour of the untreated original wax coated stained wood.

It was found that compositions A and B worked better than the comparative product, Krud Kutter® at removing the wax coating and the stain to leave good quality bare wood. The wood revealed by A and B is a lighter colour than the wood revealed by Krud Kutter®, and all three are a lighter colour than the untreated original wax coated wood (central horizontal band). The stain was not removed by Krud Kutter®.

Surprisingly, composition B demonstrated better results that composition A. This is shown by the lighter colour of the portion of wood revealed by the treatment with composition B, compared to that revealed by composition A. In addition, the surface texture of the portion of wood revealed by composition B was superior to the surface texture of the portion of wood revealed by composition A.

This result is surprising because it would not be expected that increasing the water content of the A composition, namely diluting it, would lead to a better cleaning or coating-removal action coupled with stain removal.

Similar amounts of a standard oil-based white paint were then applied to the six areas of the same wood panel resulting from the above experiment (i.e. the two areas cleaned by Krud Kutter®, the two areas cleaned by composition A and the two areas cleaned by composition B). Once dry, masking tape was applied to the top half (as seen in FIG. 1) of each of the six areas of white paint, left for a standard length of time and then removed in a similar manner in each case, in order to test the adhesion strength of the paint to the cleaned bare wood surface.

The results are shown in FIG. 1. It was found that less damage to the paint was caused (i.e. the paint adhered more strongly to the bare wood) when compositions A and B had been used, in comparison to where the comparative product, Krud Kutter® had been used. The paint adhered more strongly to the area of bare wood that had been cleaned by composition B, according to the present invention, than to the area of bare wood that had been cleaned by the comparison composition A. The paint adhered less strongly to the area of bare wood that had been cleaned by Krud Kutter® than to either of the areas of bare wood that had been cleaned by composition A or B. The dark patches in the painted areas at the end of the above test (FIG. 1) are the underlying wood showing through, and provide the visual evidence for the above conclusions.

The results of this paint adhesion test correlate with the observable colour of the stripped and de-stained wood and the quality of the surface of the bare wood, shown in FIG. 1 and described above.

Example 2—Cleaning/Stripping a Wooden Box

Figure 2:
FIG. 2 shows the results of the experiment described in Example 2.

Composition B was used to clean a wooden 50 year old box having old varnish and grease on the wood surface. The composition was applied to a cloth and gently rubbed onto the box surface without being left to stand. The result is shown in FIG. 2, the cleaned/stripped portion being indicated by the arrow.

Composition B was able to clean/strip the surface of the box, removing all old varnish and grease down to bare wood, in less than one minute.

Example 3—Cleaning/Stripping a Range of Substrates

Compositions A, B, C and D were applied to a range of surfaces, including wood, uPVC and slate. The cleaning and paint removal action was monitored under comparable conditions. Compositions B, C and D all worked to clean or strip the surfaces, although more rubbing was required with composition D. The use of a higher temperature would be expected to reduce the need for more rubbing. Composition A also worked, but not so well as B and C.

From this experiment it is shown that the improved efficacy of the composition of the present invention above 80% by weight of water is maintained to at least 97% by weight of water.

Example 4—Removal of Old Paint

Composition E was applied to a small section of old (c. 100 years old) Victorian painted wood which is used as a test piece for paint removal experiments. A section having three layers of old paint was selected. After 20 minutes of standing the composition and paint were removed by lifting with a blade instrument. It was found that this composition can remove the three coats of old paint in 20 minutes down to bare wood.

Figure 3:
FIG. 3 shows the results of the experiment described in Example 4.

The result is shown in FIG. 3. The treated section showing the bare wood is in the centre of the photograph.

Example 5—Removal of Old Paint

Composition F was applied to a small section of old painted wood having five coats of paint. After 1 and 2 hours of standing the composition and paint were removed by lifting with a blade instrument. It was found that this composition can remove the five coats of old paint in 1 hour down to bare wood, although the result is more complete after 2 hours.

Figure 4:
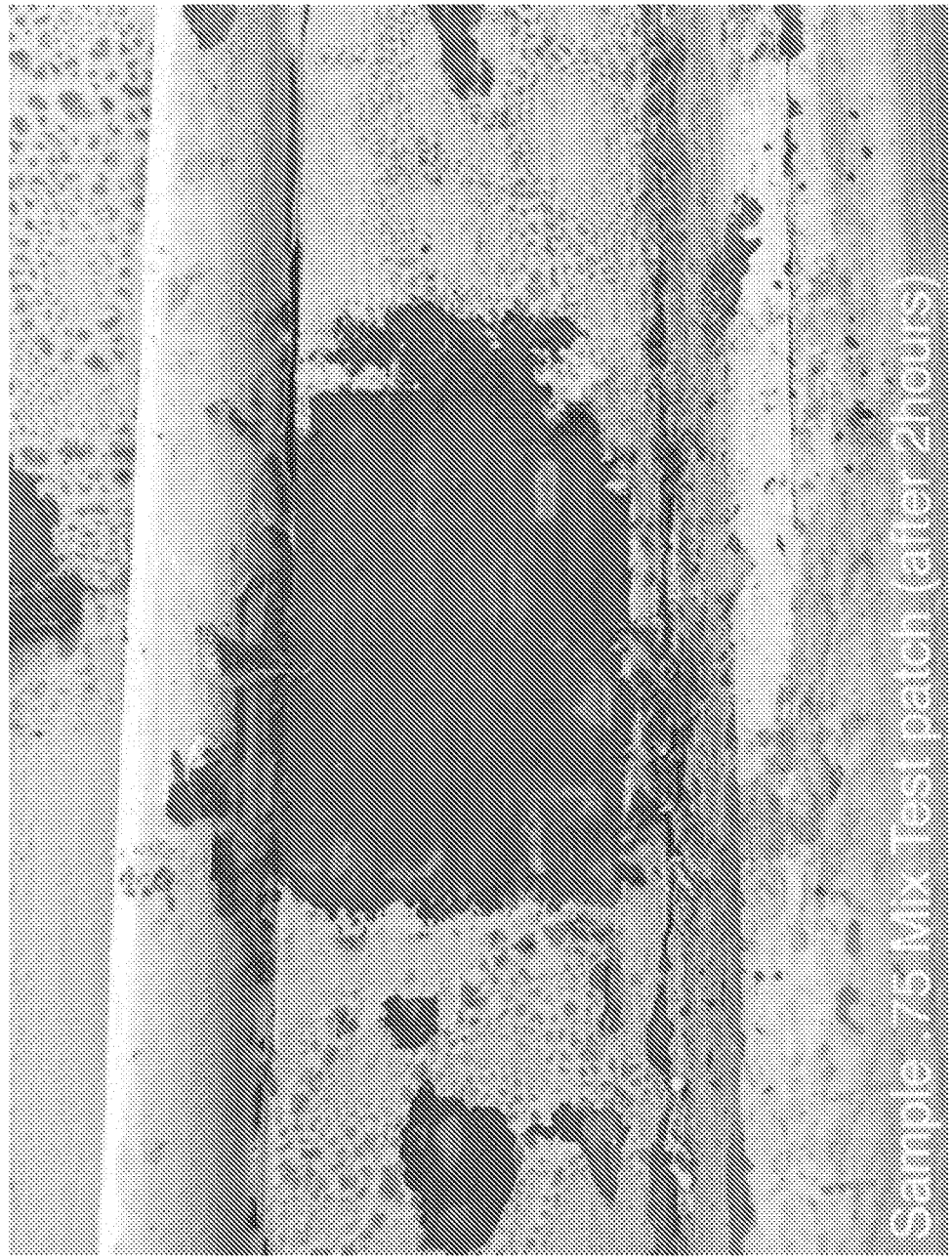
FIG. 4 shows the results of the Experiment described in Example 5.

The result after 2 hours is shown in FIG. 4. The treated section showing the bare wood is in the centre of the photograph.

The foregoing broadly describes certain embodiments of the present invention without limitation. Variations and modifications as will be readily apparent to those skilled in the art are intended to be within the scope of the present invention as defined in and by the appended claims.

The invention claimed is:

1. An aqueous composition comprising:
   (a) the following components (i) and (ii):
      (i) at least one compound of formula (I)

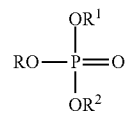

wherein R, $R^1$ and $R^2$, which may be the same or different, represent optionally substituted lower alkyl, optionally substituted phenyl or optionally substituted lower alkyl-phenyl groups; and
      (ii) at least one ester selected from optionally substituted lower alkyl diesters of dibasic $C_{2-20}$ carboxylic acids and optionally substituted lower alkyl triesters of tribasic $C_{4-20}$ carboxylic acids;
   (b) optionally, at least one surfactant;
   (c) water;
   (d) optionally, a rheology control agent to cause the composition to be in the form of a gel; and
   (e) optionally, one or more anti-foaming agent cooperating with the surfactant(s) to reduce foaming;
characterised in that:
   component (c) (water) is present in an amount of from about 83% to less than about 99.0% by weight of the aqueous composition;
   the composition is a stable emulsion; and
   preferably, the composition formed by components (a), (c) and if present (b) is optically transparent;
   with the proviso that, when component (a(i)) is or includes tributoxyethyl phosphate and component (a(ii)) is or includes simultaneously dibutyl phthalate, then component (c) (water) is present in an amount of greater than 85.0% by weight of the aqueous composition.

2. A method for cleaning a surface, or a method for removing a coating from a surface, or a method for plasticising or softening a coating or other surface-adhered material prior to stripping or mechanical removal thereof from a surface, comprising applying to the surface or coating an aqueous composition comprising:
   (a) the following components (i) and (ii):
      (i) at least one compound of formula (I)

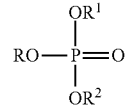

wherein R, $R^1$ and $R^2$, which may be the same or different, represent optionally substituted lower alkyl, optionally substituted phenyl or optionally substituted lower alkyl-phenyl groups; and (ii) at least one ester selected from optionally substituted lower alkyl diesters of dibasic $C_{2-20}$ carboxylic acids and optionally substituted lower alkyl triesters of tribasic $C_{4-20}$ carboxylic acids;

(b) optionally, at least one surfactant;

(c) water;

(d) optionally, a rheology control agent to cause the composition to be in the form of a gel; and (e) optionally, one or more anti-foaming agent cooperating with the surfactant(s) to reduce foaming;

characterised in that:

component (c) (water) is present in an amount of from about 83% to less than about 99.0% by weight of the aqueous composition;

the composition is a stable emulsion; and preferably, the composition formed by components (a), (c) and if present (b) is optically transparent.

3. A process for making an aqueous composition according to claim 1, comprising mixing components (a), (b), (c) and optionally (d) and optionally (e) to form a stable emulsion.

4. A aqueous composition consisting essentially of:

(a) the following components (i) and (ii):

(i) at least one compound of formula (I)

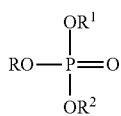

wherein R, $R^1$ and $R^2$, which may be the same or different, represent optionally substituted lower alkyl, optionally substituted phenyl or optionally substituted lower alkyl-phenyl groups; and (ii) at least one ester selected from optionally substituted lower alkyl diesters of dibasic $C_{2-20}$ carboxylic acids and optionally substituted lower alkyl triesters of tribasic $C_{4-20}$ carboxylic acids;

(b) optionally, at least one surfactant;

(c) water;

(d) optionally, one or more rheology control agent to cause the composition to be in the form of a gel; and (e) optionally, one or more anti-foaming agent cooperating with the surfactant(s) to reduce foaming;

characterised in that:

component (c) (water) is present in an amount of from about 83% to less than about 99.0% by weight of the aqueous composition;

the composition is a stable emulsion; and preferably, the composition formed by components (a), (c) and if present (b) is optically transparent.

5. The aqueous composition of claim 4, said composition consisting only of:

(a) said components (i) and (ii);

(b) optionally, said at least one surfactant;

(c) said water;

(d) optionally, said rheology control agent to cause the composition to be in the form of a gel; and (e) optionally, said one or more anti-foaming agent cooperating with the surfactant(s) to reduce foaming.

6. The method according to claim 2, wherein at least one of grease, waxes, oil, resins, tar, ink, magic marker ink, paint (including spray-paint), varnish, lacquer, stains (including wood staining compositions applied to a wooden surface), dirt, mould or foodstuffs is removed from surfaces.

7. The composition according to claim 1, wherein the composition is optically transparent and exists as a stable emulsion which does not have a cloudy appearance.

8. The composition according to claim 1, wherein a surfactant is present in the composition.

9. The composition according to claim 1, wherein a rheology control agent is present in the composition.

10. The composition according to claim 9, wherein the composition containing the rheology control agent is optically transparent.

11. The composition according to claim 1, wherein an anti-foaming agent is present in the composition.

12. The composition according to claim 1, wherein the component (a(i)) is or comprises triethyl phosphate.

13. The composition according to claim 1, wherein the component (a(ii)) is or comprises one or more of dimethyl adipate, dimethyl succinate and dimethyl glutarate.

14. The composition according to claim 1, wherein the component (b) is present and is or comprises a non-ionic water-soluble block copolymer of more than one alkylene oxide.

15. The composition according to claim 1, wherein the component (d) is present and is or comprises a synthetic hectorite clay.

16. The composition according to claim 1, wherein the component (e) is present and is or comprises a $C_{1-10}$ alkyl alcohol, selected from the group consisting of hexan-1-ol.

* * * * *